(12) United States Patent
Wenstrand et al.

(10) Patent No.: US 6,983,080 B2
(45) Date of Patent: Jan. 3, 2006

(54) RESOLUTION AND IMAGE QUALITY IMPROVEMENTS FOR SMALL IMAGE SENSORS

(75) Inventors: John S. Wenstrand, Menlo Park, CA (US); Todd S. Sachs, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 721 days.

(21) Appl. No.: 10/199,376

(22) Filed: Jul. 19, 2002

(65) Prior Publication Data

US 2004/0013319 A1    Jan. 22, 2004

(51) Int. Cl.
  *G06K 9/36*    (2006.01)

(52) U.S. Cl. ...................... 382/284; 382/299

(58) Field of Classification Search ............... 382/162, 382/284, 299, 300, 312; 345/629, 660; 348/223.1, 348/234, 222.1, 260
See application file for complete search history.

(56) References Cited

U.S. PATENT DOCUMENTS

| | | | |
|---|---|---|---|
| 5,157,481 A | 10/1992 | Kashimura et al. | |
| 5,644,139 A | 7/1997 | Allen et al. | |
| 5,729,008 A | 3/1998 | Blalock et al. | |
| 6,078,307 A * | 6/2000 | Daly | 345/600 |
| 6,233,368 B1 | 5/2001 | Badyal et al. | |
| 6,295,087 B1 * | 9/2001 | Nohda | 348/234 |
| 6,788,338 B1 * | 9/2004 | Dinev et al. | 348/222.1 |
| 6,803,949 B1 * | 10/2004 | Kitagawa | 348/223.1 |

* cited by examiner

*Primary Examiner*—Kanjibhai Patel

(57) ABSTRACT

An image having higher resolution and/or better color is generated from multiple images of a subject taken by a handheld imaging device. The motion of the device, even when a user holds the device steady, gives the images perspectives that differ by an amount ranging from a fraction of a pixel to a few pixels. The differences in perspective provide different information about the subject that can be combined to create a better image. In particular, an image shifted by a non-integer number of pixels relative to another image provides information about portions of the subject that are between the pixels of the other image and usable for increasing resolution. Images shifted relative to each other by an integer number of pixels have aligned pixels that may provide different color information for the same portion of the subject when the aligned pixels correspond sensor elements having different color filters.

10 Claims, 3 Drawing Sheets

RESOLUTION AND IMAGE QUALITY IMPROVEMENTS FOR SMALL IMAGE SENSORS

BACKGROUND

Multifunction portable devices ideally provide a user with maximum flexibility and capability in a single compact and portable package. Such devices may be based on devices such as portable telephones and personal digital assistants (PDAs) that are enhanced to provide capabilities beyond communications or computing. Image capture functions, for example, are a desirable addition to the capabilities of such devices, and compact CMOS image sensors are now making possible the cost-effective addition of image capture capabilities to portable devices such as telephones and PDAs.

The image sensors in portable devices are preferably inexpensive and must necessarily be small to minimize the size of the portable device. These restrictions on the image sensors generally require that the image sensors have a lower image resolution than would be used in a state of the art digital camera. A current digital camera, for example, may provide megapixel resolution for images, while an image sensor that is practical for a telephone or PDA may only provide a CIF or VGA resolution (i.e., 352×288 or 640×480).

The lower resolution of a small and inexpensive image sensor is adequate or even preferable for many uses of imaging in multifunction portable devices. Low-resolution image sensors, for example, often provide greater sensitivity and greater dynamic range because of the acceptability of larger pixel size. Further, images having a lower resolution require less memory for storage and less bandwidth for transmission, which is important for a portable device having a relatively limited amount of available memory and/or transmission bandwidth. A low resolution image sensor may also match the resolution of a viewfinder or other small display on the portable device allowing direct display the low-resolution images from the low-resolution image sensor without up or down sampling that consumes processing power.

On some occasions, users will want to capture images at a higher resolution or quality than the image sensor in a multi-function device can provide. Such users currently need to have a separate camera or other device for high-resolution imaging. A method for providing high-resolution images using a low-resolution image sensor is thus needed to permit a multi-function portable device to serve more imaging functions.

SUMMARY

In accordance with an aspect of the invention, a low-resolution image sensor in a handheld device such as a camera, a portable telephone, or PDA takes multiple low-resolution images for generation of a high-resolution or high quality image. Natural movement of the handheld device between images provides slightly different perspectives to the low-resolution images. The differences in perspective, which typically correspond to movement of an image sensor by a fraction of a pixel up to a few pixels in the low-resolution images, allow digital processing that constructs a high-resolution or high quality image from the low-resolution images. Off-line digital processing can construct the improved image to avoid overtaxing the processing capabilities of the handheld device.

One imaging process in accordance with the invention records in a quick succession of slightly differing low-resolution images of the same subject. For a pair of the images, computed correlations of small image areas provide a relative motion field that identifies matching areas of the two images. The relative motion field can be smoothed to calculate a continuous motion field. Based on the motion fields enable for the succession of images, coordinates relative to a reference image can be assigned to each pixel of each image. All pixels, now on a non-uniform reference grid, are used to calculate local image characteristics of the subject. The resulting image characteristics can be sampled at increased resolution, thus integrating the information captured by the low-resolution images into a high-resolution image.

In accordance with another aspect of the invention, a process generating a color image uses color information from a series of images of the same subject. Optical navigation techniques can be used to align the images for a combination that forms the color image. Variations in perspective of the images can cause sensor elements having different color filters to provide different color components of the same pixel. Demosaicing, which determines unmeasured color components by interpolation of the colors of neighboring pixels, can be reduced or eliminated when different images provide different color components for the same pixel. The resolution of resulting color image can also be increased using the image data from the series of images.

One embodiment of the invention is a process for generating a combined image that can have a higher resolution or better color accuracy than do raw images taken with a handheld device. The process starts with taking multiple raw images of a subject using the handheld device. The raw images of the subject can be taken while holding the handheld device steady in a user's hand and taking the images at a frame rate similar to that used for video. Natural motions inherent for handheld device cause the raw images to have different perspectives. The raw images can be processed in the handheld device, stored in the handheld device for later downloading to a storage or processing system, or immediately transmitted via a communication link of the handheld device to a storage or processing system.

Analysis of the raw images identifies motion of the images relative to each other, and the identified motion and the pixel data from the multiple images can be used for a pixel-by-pixel construction of the combined image. One analysis method that identifies motion of a raw image relative to a reference image generates a continuous motion field that maps pixels in the raw image to locations in the reference image. Motion determination to the accuracy of a fraction of a pixel can be achieved by expanding the image to a resolution higher than a resolution of an image sensor in the handheld device, finding at least one motion vector identifying an area in the image that best matches an area in the reference image, and generating the continuous motion field from the at least one motion vector for the image. Conventional techniques using cross correlations, match filters, or feature matching, for example, can identify relative movement for the generation of the motion field.

For each pixel in the combined image, the construction of the combined image includes identifying one or more nearby pixels that after correcting for the determined motion of the images are less than a threshold distance from a location corresponding to the pixel in the combined image. A pixel value such as a color value or a color component for the pixel in the combined images is then determined from one or more pixel values of the nearby pixels. Determining the pixel value for a pixel in the combined images can include identifying in one of the raw images a source pixel that maps to a location of the pixel in the combined image, and using a pixel value associated with the source pixel as the pixel value of the pixel in the combined image. Alternatively, a weighted average of the pixel values of nearby pixels provides the pixel value for the pixel in the combined image.

BRIEF DESCRIPTION OF THE DRAWINGS

Use of the same reference symbols in different figures indicates similar or identical items.

DETAILED DESCRIPTION

In accordance with an aspect of the invention, an image processing method takes a series of images of the same subject using a low-resolution image sensor in a handheld device, aligns pixels in the raw images to characterize movement of the handheld device, and generates from the raw images and the characterized movement a combined image having a higher resolution and/or more accurate color than do the individual images from the series. Each pixel in the combined image can be generated using a weighted average that is most heavily weights pixel data corresponding to locations nearest the corresponding pixel in the combined image.

Figure 1:
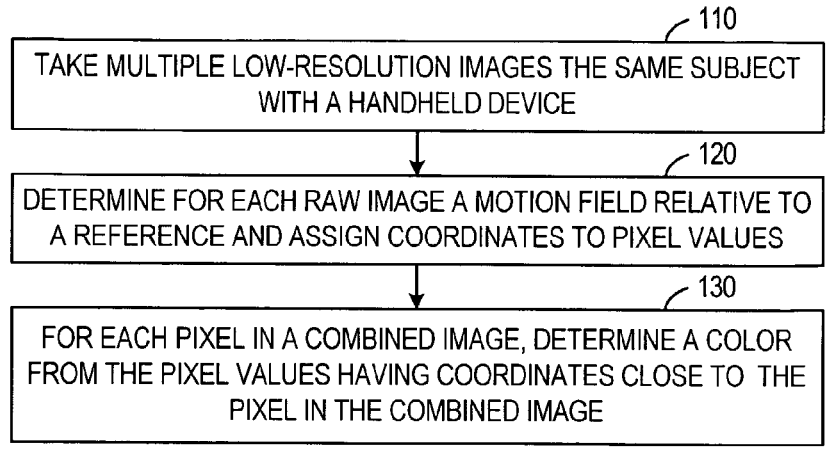
FIG. 1 is a flow diagram of a process for forming a combined image having improved image quality using a low-resolution image sensor.

FIG. 1 is a flow diagram of a process 100 in accordance with an embodiment of the invention. Process 100 takes multiple raw images in a step 110, determines the motion of the images relative to a reference image in step 120, and combines information from the raw images to construct a combined image having improved resolution and/or color accuracy in step 130.

Step 110 captures the series of raw images of the same subject using a handheld device such as a camera or any other portable device having imaging capabilities. The series of images of the subject are preferably taken within a time interval that is short enough that the subject does not change significantly. For stationary or slow moving subject, a series of about 5 to 10 images taken at a rate of about 30 per second or higher provides a set of raw images sufficient for generating a high-resolution or high quality image. Such frame rates would normally be implemented in a camera or other device capable of capturing video.

During step 110, the handheld device generally moves slightly even if the user attempts to hold the handheld device steady. As the device moves, the image of the subject shifts relative to the image sensor. The amount of the shift may be a fraction of a pixel, one or more whole pixels, or one or more whole pixels plus a fraction of a pixel.

Figure 2A:
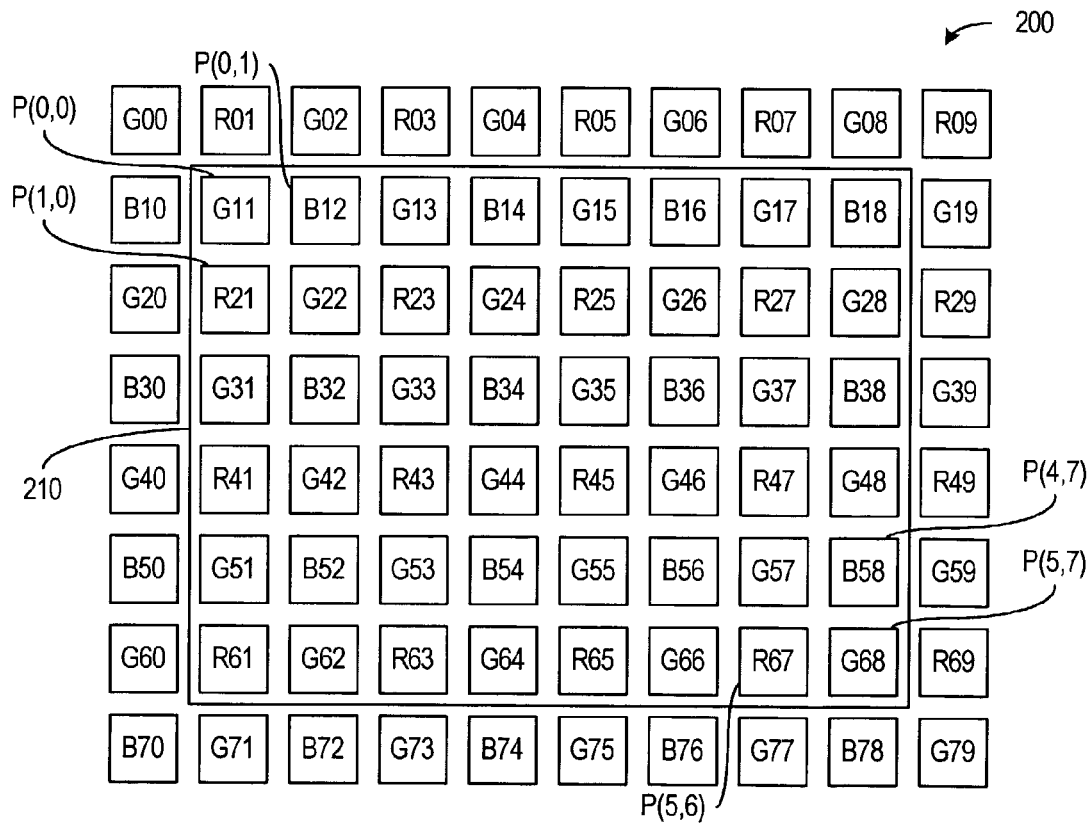
FIGS. 2A, 2B, and 2C show the relative positions on an image sensor of respective images of the same subject.

FIG. 2A illustrates the position of a reference image 210 relative to an array of sensor elements that make up an image sensor 200. For ease of illustration, FIG. 2A shows only 10×8 array of sensor elements, but a current low-resolution image sensor would generally contain hundreds of sensor elements per row or column. Each sensor element in FIG. 2A is labeled Rmn, Bmn, or Gmn, where in and n respectively indicate a row number and a column number of the sensor element in image sensor 200. For illustrative purposes, sensor 200 is of a type having color filters fixed relative to the sensor elements, and the reference symbol for each sensor element starts with an "R", "B", or "G" to respectively designate that the sensor element includes a fixed red, blue, or green filter. Image sensor 200 with its fixed RGB color filters is merely an example of one suitable image sensor, and other types of image sensors would also be suitable.

Capturing image 210 requires projecting the image of the subject onto image sensor 200. Each sensor element within the area of image 210 then corresponds to a different pixel in a pixel map representing image 210. Sensor elements Gil, B12, and R21, for example, respectively correspond to pixels P(0,0), P(0,1), and P(1,0), which are in a top-left portion of image 210 and the corresponding pixel map array. Sensor elements B58, R67, and G68 respectively correspond to pixels P(4,7), P(5,6), and P(5,7), which are at the bottomright.

Each sensor element generates a signal indicating the intensity of light passing through the corresponding color filter and therefore indicating one color component of the color value for the corresponding pixel. Sensor element Gil, for example, generates a signal indicating the intensity of light passing through a green filter, and the normalized digital level assigned to that measured intensity is the green component of the color value for pixel P(0,0) of image 210. Similarly, the signal from sensor element B12 indicates a blue component of the color value for pixel P(0,1), and the signal from sensor element R21 indicates a red component of the color value for pixel P(1,0).

Conventional mosaicing techniques can interpolate between color components measured for adjacent pixels to determine the color components that are not directly measured. For example, in FIG. 2A, interpolation of the red components of pixels that sensor elements R01 and R21 measure can indicate the red component of the color value for pixel P(0,0), and interpolation of the blue components of pixels that sensor elements B10 and B12 measure can indicate the blue component of the color value for pixel P(0,0). The red, blue, and green color components together form a color value indicating the color of the pixel.

Figure 2B:
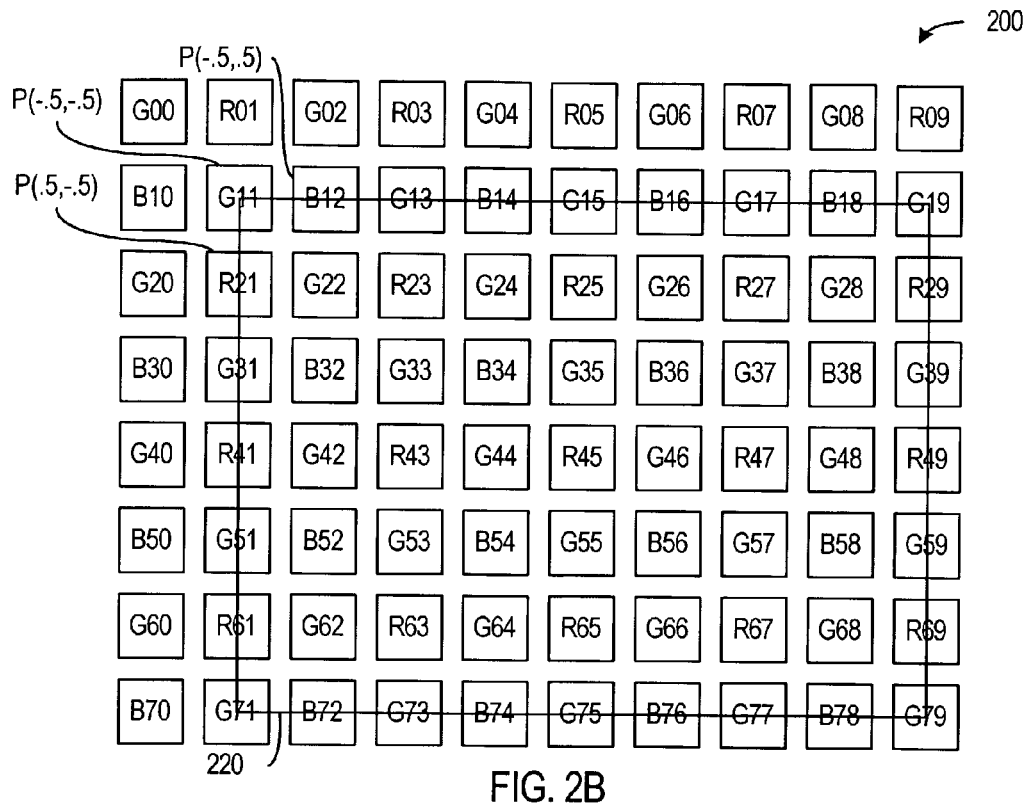

After step 110 of FIG. 1 takes the series of raw images of a subject, step 120 determines a motion field for each of the raw images relative to a reference image. For example, image 210 of FIG. 2A can be selected as the reference image. A second image of the same subject will generally be shifted relative to image 210 on image sensor 200. FIG. 2B shows an example where an image 220 is taken after image sensor 200 moves up and left by a distance corresponding to about one half a pixel. Image 220 of the subject is thus shifted down and right by one half pixel relative to the position of reference image 210, and when taking image 220, the sensor elements of image sensor 200 measure intensities corresponding to pixels that are half-way between the pixels of image 210. For image 220, each sensor element can be assigned fractional pixel coordinates (e.g., half-pixel coordinates) in the coordinate system of the reference image 210.

Identifying the coordinates of pixels or sensor elements of a target image in the coordinate system of the reference image requires identifying the motion or shift of the target image relative to the reference image. One method for accurately identifying relative shift or motion to an accuracy smaller than a pixel expands the reference and target images to a higher resolution and then finds motion vectors identifying matching areas in the two expanded images. The expansion of a pixel map of the target or reference image is preferably such that original color values are blended or interpolated to generate intervening color values in an expanded pixel map. For example, a discrete cosine transform (DCT) of the original pixel map converts the pixel map to a frequency domain array having the same dimensions or resolution as the original pixel map. The frequency domain array can be expanded to a higher resolution by adding the higher frequency components with value zeros. An inverse DCT then converts the higher resolution frequency domain array to a space domain pixel map that has a higher resolution than the original pixel map but contains the same information.

Correlations of areas in the expanded pixel map of the reference image with areas in the expanded pixel map of a target image are then calculated to identify the motion of matching areas in the two images. Optical navigation techniques and circuits, which are well-known in the art, can be used to determine the correlations of the images and thereby identify relative motion. U.S. Pat. Nos. 5,644,139, 5,729, 008, and 6,233,368 describe some navigation processes and circuits that could be applied in embodiments of the invention.

Motion vectors are generally employed to indicate the relative motion in images. If the difference in perspectives for the reference and target images corresponds to camera motion perpendicular to the line of sight to the subject and the subject is exactly the same for the reference and target images, a single motion vector may be sufficient to define a motion field characterizing the relative motion of the two images. More generally, the change in perspective between images may involve a change in camera angle or a change in the subject, so that different areas of the reference image have different motion vectors.

The one or more motion vectors determined for the two images define a mapping of the coordinates of pixels in the target image to the coordinates of the reference image. Rather than using discrete changes in the motion vectors at the boundaries of areas used in determining correlations, a continuous motion field may more accurately reflect the relationship between the two images and can be used to determine the coordinates of the pixels of the target image in the reference image.

Step 130 of process 100 (FIG. 1) combines all the pixel information from the images to form a combined image. The pixel data can be combined using coordinates of the pixels as referred back to the reference image. In particular to provide a combined image having twice as many pixels per row and twice as many pixels per column as provided by image sensor 200, a color value is determined for each pixel of the high-resolution image having integer or half-integer coordinates in the reference coordinate system of the reference image. The color value for a particular pixel in the combined image can be determined using a filter operation or a weighted average of color values of pixels in the raw images that map into a small area around the pixel in the combined image. In some cases, one of the raw images has a pixel having coordinates equal to the pixel being determined, and the color value of the pixel with matching coordinates can be used without determining an average.

Figure 2C:
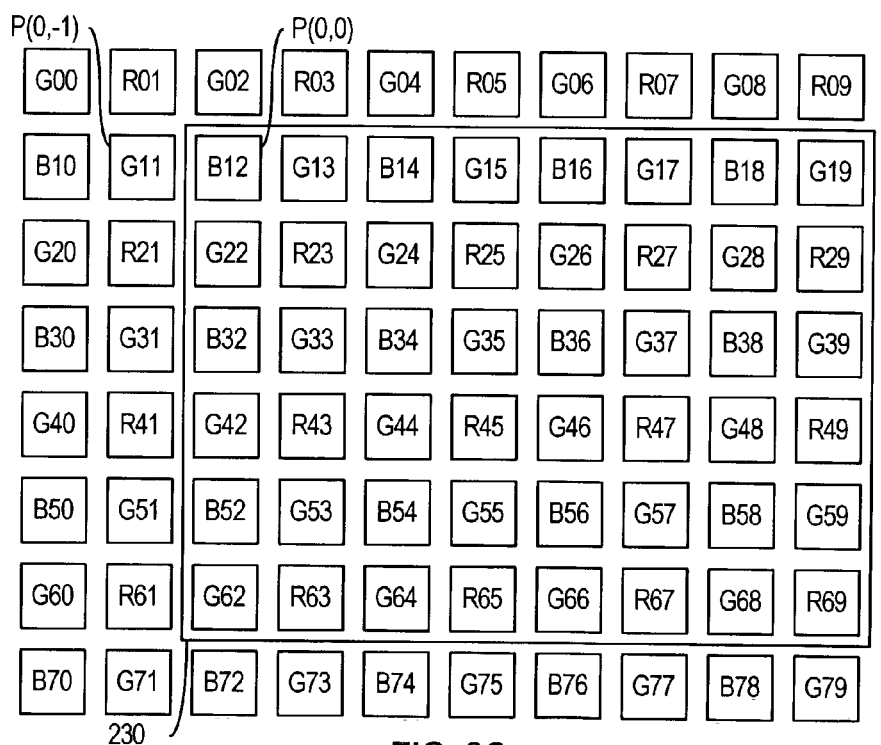

The above-described combination process uses the color values from the individual images in constructing the combined image. Those color values may include interpolated components calculated using conventional mosaicing techniques. In accordance with a further aspect of the invention, the combined image can be constructed directly from the measured color components of images being combined. In particular, for the same pixel one image may provide the green component of the color value, while another image provides the blue component. To illustrate this, FIG. 2C shows an image 230 formed when image sensor 200 happened to have moved left by one pixel relative to the position of image sensor when taking image 210 of FIG. 1. For image 230, sensor element B12 performed an intensity measurement corresponding to pixel P(0,0) and provided a blue component of a color value for pixel P(0,0). For image 210, sensor element G11 performed the intensity measurement corresponding to pixel P(0,0) and provided a green component of a color value for pixel P(0,0). Accordingly, if images 210 and 230 are among the series of images used to construct a combined image, color accuracy can be improved because both the blue and green components of pixel P(0,0) are directly measured instead of being interpolated.

A general technique for improving color accuracy for any pixel can use a weighted average of the directly measured color components for pixels in a small surrounding area. The color accuracy improvement can be employed for a combined image having any resolution including resolutions higher than or equal to the resolution of image sensor 200.

As an aspect of the invention noted above, a series of images of the same subject that differ in perspective according to natural motion of a handheld device can be used to generate a high resolution and/or high color quality image. The number of images required generally depends on the amount of improvement sought. To double the number of pixels per row and column, four raw images including a reference image, an image shifted one-half pixel left or right of the reference image, an image shifted one-half pixel up or down from the reference image, and an image shifted one-half pixel up or down and one-half pixel left or right will provide direct measurements for each pixel (with the possible exception of boundary pixels) in the high resolution image. However, since movement of the handheld device is uncontrolled (at least to shifts having a size on the order of the size of a pixel), the distribution of image positions will be more or less random and more than four images are generally required to provide the desired range of variations in the image perspectives. Too large a number of images will require a large amount of processing time and may allow time for the subject to change or move significantly. The optimal number of images that will statistically provide a desired range of perspectives without requiring undue processing power can be determined according to the characteristics of the image sensor and the desired image improvement. Alternatively, the number of images can be a user-controlled value, set according to an individual's experience.

The image processing described herein can be implemented in software executed in the handheld device. However, such processing is not required in real time when taking the images. To avoid an undue processing burden, image processing can be performed offline either by the handheld device or by a separate device such as a computer at any time after the series of images were taken.

Figure 3:
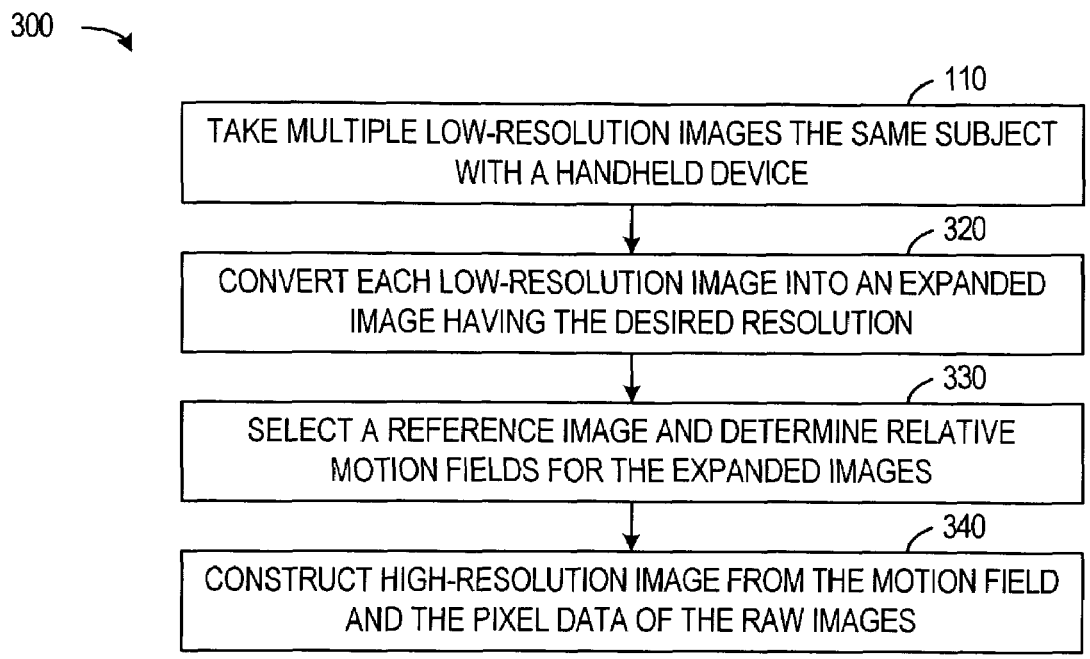
FIG. 3 is a flow diagram of a process for forming a high-resolution image from a series of low-resolution images.

FIG. 3 illustrates a process 300 that generates a high-resolution image from a series of low-resolution images. Process 300 starts the same way as process 100 with the step 110 of taking a series of images using a handheld device. The series of images can be captured when a user holds the handheld device approximately steady while taking a short video clip of a slow moving or stationary subject. The frames of the video clip provide the raw images for construction of the high-resolution image.

Step 320 converts each of the raw images to an expanded image having the desired resolution of the high-resolution image. The conversion preferably performs interpolation to generate pixel values and is therefore more than an up-sampling of the raw images. One conversion technique noted above increases the resolution of a raw image by performing a DCT transformation of the raw image, padding the resulting frequency domain array with zeros in the position of the highest frequency components, and performing an inverse DCT transformation on the padded frequency domain array. Another example of a suitable conversion technique is performing a bi-cubic interpolation of each image directly in the spatial domain.

Step 330 selects one of the expanded images as a reference image and generates for each expanded image a motion field that indicates motion of the expanded image relative to the reference image. Techniques for determination of motion vectors such as feature matching or use of cross correlations or match filters can identify the motion of each image relative to the reference image. A continuous motion field that maps each pixel of the image to a location in the reference image can then be generated according to the determined motion vectors.

Step 340, which constructs the high-resolution image, can begin with the reference image, e.g., the pixel data representing the expanded reference image. In the reference image, pixel values (e.g., red, green, or blue color components or alternatively color values determined using conventional mosaicing techniques) corresponding to sensor positions are kept, and pixel values generated as part of expansion step 320 are replaced. The replacement process identifies pixels in the other images that have directly measured pixel values and are within a threshold distance (e.g., 0.5 pixels) of the pixel having its pixel value replaced. A weighted average that most highly weights pixel values for the closest pixels provides a replacement pixel value. Using nearby pixels provide values that most nearly correspond to the pixel being determined, and also improves the signal-to-noise ratio of the pixel value by combining multiple measurements.

Although the invention has been described with reference to particular embodiments, the description is only an example of the invention's application and should not be taken as a limitation. For example, although the above describes particular sizes when referring low-resolution and high-resolution images or sensors, such references are relative references, and any resolution may be high or low depending on the comparison being made. Additionally, the above description describes specific types of image sensors, for example, having RGB color filters that are fixed relative to underlying light sensors. However, other types of image sensors, for example, using YUV color filters or color filters that are movable relative to the light sensors could also be employed. Further, the techniques described for color images could be readily adapted to processing of gray scale images. Various other adaptations and combinations of features of the embodiments disclosed are within the scope of the invention as defined by the following claims.

What is claimed is:

1. A process for generating a combined image, comprising:
    taking a plurality of images of a subject using a handheld device;
    analyzing the images to determine relative motion of the images; and
    for each pixel in the combined image,
    identifying one or more nearby pixel that after correcting for the determined relative motion of the images are less than a threshold distance from a location corresponding to the pixel in the combined image; and
    determining a pixel value for the pixel in the combined images from one or more pixel values of the nearby pixels.

2. The process of claim 1, wherein the combined image has a resolution that is greater than a resolution of the images of the subject.

3. The process of claim 1, wherein the pixel value for at least one pixel in the combined image has a first color component measured during taking of a first of the plurality of images and a second color component measured during taking of a second of the plurality of images.

4. The process of claim 1, wherein taking the plurality of images of the subject comprises holding the handheld device steady in a user's hand while taking the plurality of images.

5. The process of claim 4, wherein the images are taken in series at a rate greater than about 15 per second.

6. The process of claim 1, wherein analyzing the images comprises for each of the plurality of images, constructing a continuous motion field that maps pixels in the image to locations in a reference image.

7. The process of claim 6, wherein constructing the continuous motion field for an image comprises:
    expanding the image to create a representation of an expanded image having a resolution higher than a resolution of an image sensor in the handheld device;
    finding at least one motion vector identifying an area in the expanded image that best matches an area in the reference image; and
    constructing the continuous motion field from the at least one motion vector for the expanded image.

8. The process of claim 6, wherein determining a pixel value for a pixel in the combined images comprises identifying in one of the plurality of images a source pixel that maps to a location of the pixel in the combined image, and using a pixel value associated with the source pixel in the pixel value of the pixel in the combined image.

9. The process of claim 8, wherein the pixel value is a color value.

10. The process of claim 8, wherein the pixel value is a directly measured color component.

* * * * *